United States Patent
Lo et al.

(10) Patent No.: US 7,434,545 B2
(45) Date of Patent: Oct. 14, 2008

(54) WATER HEATER AND METHOD OF OPERATING THE SAME

(75) Inventors: Wen-Bin Lo, Taichung (TW); Kuo-Kuang Wu, Hsinchu (TW); Jing-Lyang Jeng, Hsinchu (TW); E-I Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 212 days.

(21) Appl. No.: 11/379,836

(22) Filed: Apr. 24, 2006

(65) Prior Publication Data

US 2007/0245981 A1    Oct. 25, 2007

(51) Int. Cl.
F22B 23/06    (2006.01)

(52) U.S. Cl. .............. 122/367.3; 122/32; 165/151

(58) Field of Classification Search ............ 122/32, 122/31.1, 235.31, 367.2, 367.3, 235.22, 247; 126/357.1, 362.1; 165/143, 150, 151, 161
See application file for complete search history.

(56) References Cited

U.S. PATENT DOCUMENTS

| | | | | |
|---|---|---|---|---|
| 3,759,050 A | * | 9/1973 | Slaasted et al. ............ 62/93 |
| 4,482,004 A | * | 11/1984 | Grover ................... 165/47 |
| 4,726,353 A | * | 2/1988 | Clawson ................ 122/18.4 |
| 4,738,225 A | * | 4/1988 | Juang .................. 122/367.3 |
| 6,907,846 B2 | * | 6/2005 | Hur et al. .................. 122/32 |
| 7,013,843 B1 | * | 3/2006 | Weintraub et al. ....... 122/367.3 |
| 2001/0004009 A1 | | 6/2001 | Mackelvie | |
| 2005/0139172 A1 | | 6/2005 | Ryoo | |

FOREIGN PATENT DOCUMENTS

| | | |
|---|---|---|
| TW | 82209156 | 12/1993 |
| TW | 093215172 U | 5/2005 |
| TW | 094215210 U | 1/2006 |

* cited by examiner

Primary Examiner—Gregory A Wilson
(74) Attorney, Agent, or Firm—Akin Gump Straus Hauer & Feld LLP (57) ABSTRACT

A gas water heater device includes a combustion chamber for providing a gas flow, a pipe assembly, and a heat exchanger disposed over the combustion chamber including a plurality of thermal conductors disposed in parallel with each other, each of the plurality of thermal conductors further comprising a base, a plurality of through holes accommodating the pipe assembly therethrough, and a flange for collecting condensed water formed on the base.

18 Claims, 7 Drawing Sheets

WATER HEATER AND METHOD OF OPERATING THE SAME

BACKGROUND OF THE INVENTION

The present invention generally relates to a water heater device and, more particularly, to a gas water heater and a method of operating the same.

Figure 1:
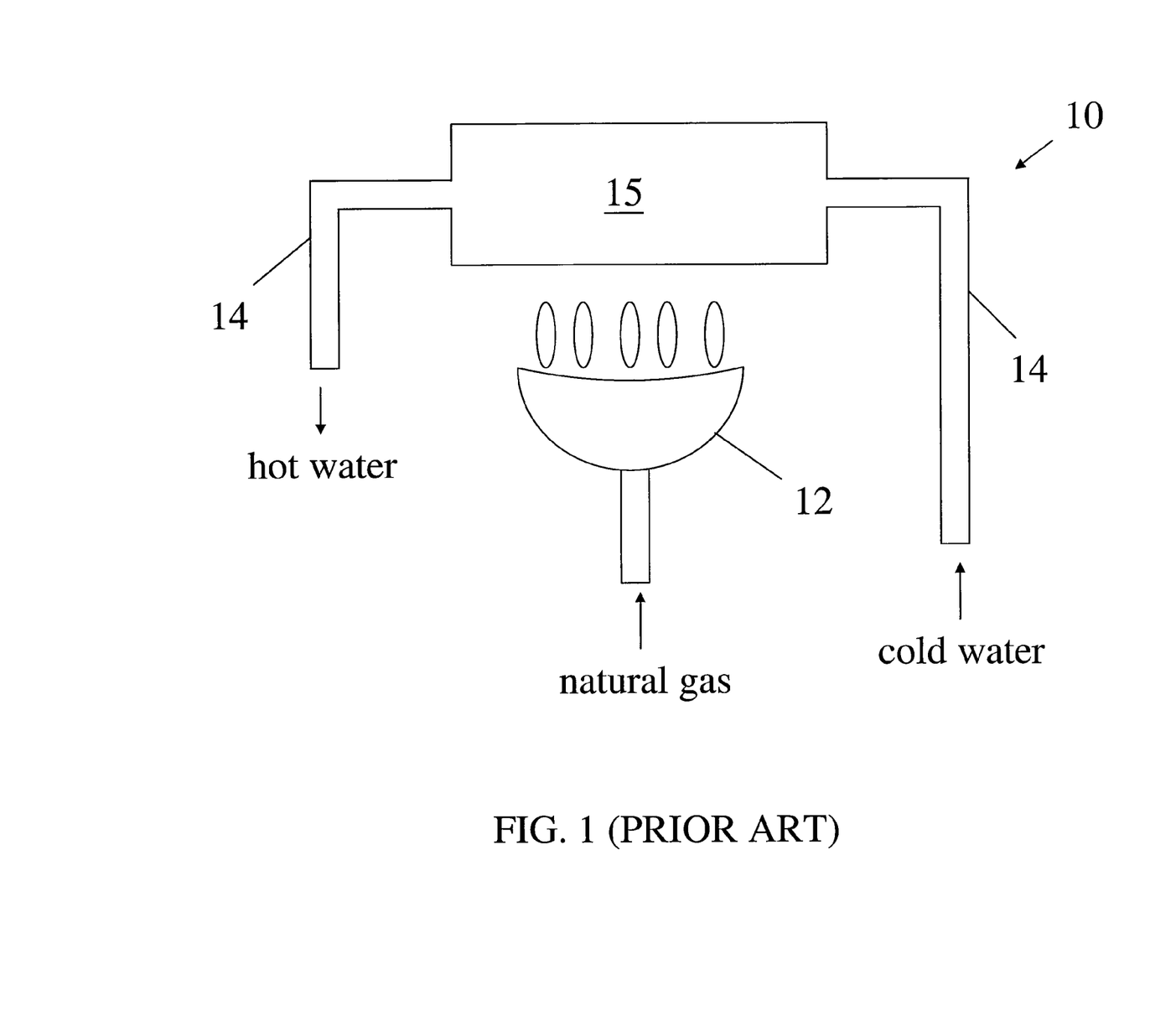
FIG. 1 is a schematic diagram of a conventional water heater.

Gas water heaters using natural gas such as LNG (liquefied natural gas), LPG (liquefied petroleum gas) or SG (synthetic gas) as fuel for heating water to a temperature level have been widely used. FIG. 1 is a schematic diagram of a conventional water heater 10. Referring to FIG. 1, the water heater 10 includes a combustion chamber 12, a pipe assembly 14 and a heat exchanger 15. High-temperature gas including carbon dioxide ($CO_2$) and vapor are generated after the combustion. Cold water from an inlet (not numbered) of the pipe assembly 14 is heated when it passes through the heat exchanger 15. During the heating process, the heat exchanger 15 conducts a thermal exchange between the cold water and high-temperature gas. Consequently, hot water is supplied from an outlet (not numbered) of the pipe assembly 14. The conventional water heater 10 usually has a thermal efficiency ranging from 70% to 83%, which means that a considerable amount of heat energy generated during the heating process is dissipated, generally in the form of waste gas. The temperature of the waste gas is approximately 200° C. (degrees Celsius). Moreover, the vapor may condense into water drops that will yield condensed water. The condensed water may adversely affect the combustion, and may even erode the pipe assembly 14 and the heat exchanger 15.

It is desirable to have a gas water heater that is able to recycle waste gas so as to improve the thermal efficiency, and discharge condensed water, if any, in a more efficient manner.

BRIEF SUMMARY OF THE INVENTION

The present invention is directed to a gas water heater device and a method of operating the same that obviate one or more problems resulting from the limitations and disadvantages of the prior art.

In accordance with an embodiment of the present invention, there is provided a gas water heater device that comprises a combustion chamber for providing a gas flow, a pipe assembly, and a heat exchanger disposed over the combustion chamber including a plurality of thermal conductors disposed in parallel with each other, each of the plurality of thermal conductors further comprising a base, a plurality of through holes accommodating the pipe assembly therethrough, and a flange for collecting condensed water formed on the base.

Also in accordance with the present invention, there is provided a gas water heater device that comprises a combustion chamber for providing a gas flow, a pipe assembly, a first heat exchanger disposed over the combustion chamber including a plurality of thermal conductors disposed in parallel with each other, each of the plurality of thermal conductors further comprising a base, a plurality of through holes accommodating the pipe assembly therethrough, and a flange for collecting condensed water formed on the base, and a second heat exchanger disposed between the first heat exchanger and the combustion chamber.

Further in accordance with the present invention, there is provided a gas water heater device that comprises a combustion chamber for providing a gas flow, a pipe assembly, a heat exchanger disposed over the combustion chamber including a plurality of thermal conductors disposed in parallel with each other, each of the plurality of thermal conductors further comprising a base, a plurality of through holes accommodating the pipe assembly therethrough, and a first flange for collecting condensed water formed on the base, and a housing including a second flange for collecting water from the first flange of each of the plurality of thermal conductors.

BRIEF DESCRIPTION OF THE SEVERAL VIEWS OF THE DRAWINGS

The foregoing summary as well as the following detailed description of the preferred embodiments of the present invention will be better understood when read in conjunction with the appended drawings. For the purposes of illustrating the invention, there are shown in the drawings embodiments which are presently preferred. It is understood, however, that the invention is not limited to the precise arrangements and instrumentalities shown. In the drawings.

DETAILED DESCRIPTION OF THE INVENTION

Figure 2:
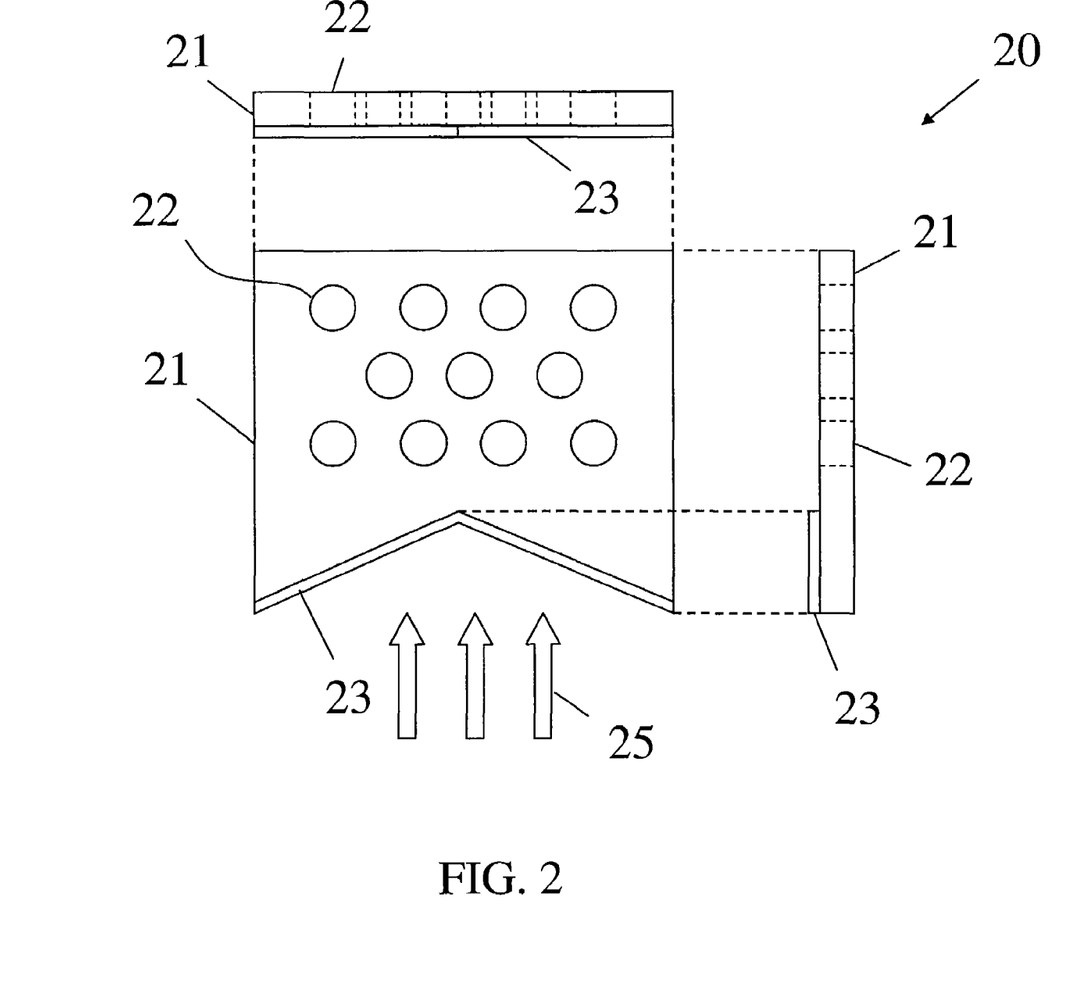
FIG. 2 is a schematic diagram illustrating a front elevational view, a top plan view and a right side elevational view of a thermal conductor of a heat exchanger in accordance with one embodiment of the present invention.

FIG. 2 is a schematic diagram of a thermal conductor, generally designated 20, of a heat exchanger in accordance with one embodiment of the present invention. Referring to FIG. 2, the thermal conductor 20 includes a base 21, a plurality of through holes 22 and a flange 23. The thermal conductor 20 is disposed over a combustion chamber (not shown) such that the normal direction of the base 21 is substantially orthogonal to the direction of a high-temperature gas flow 25 from the combustion chamber. The base 21 is made of a thermally conductive material such as copper in the form of a sheet. The plurality of through holes 22 provided on the base 21 allow passage of a pipe assembly, which is also made of a thermally conductive material. The flange 23 collects and discharges condensed water formed on the base 21 during a heating process. Given a household gas water heater, the flange 23 protrudes from the base 21 by a distance of approximately 1 mm (millimeter). The flange 23, disposed at a lower part of the base 21, has an inverted V shape with respect to the gas flow 25 to facilitate collection and discharge of the condensed water.

Figure 3:
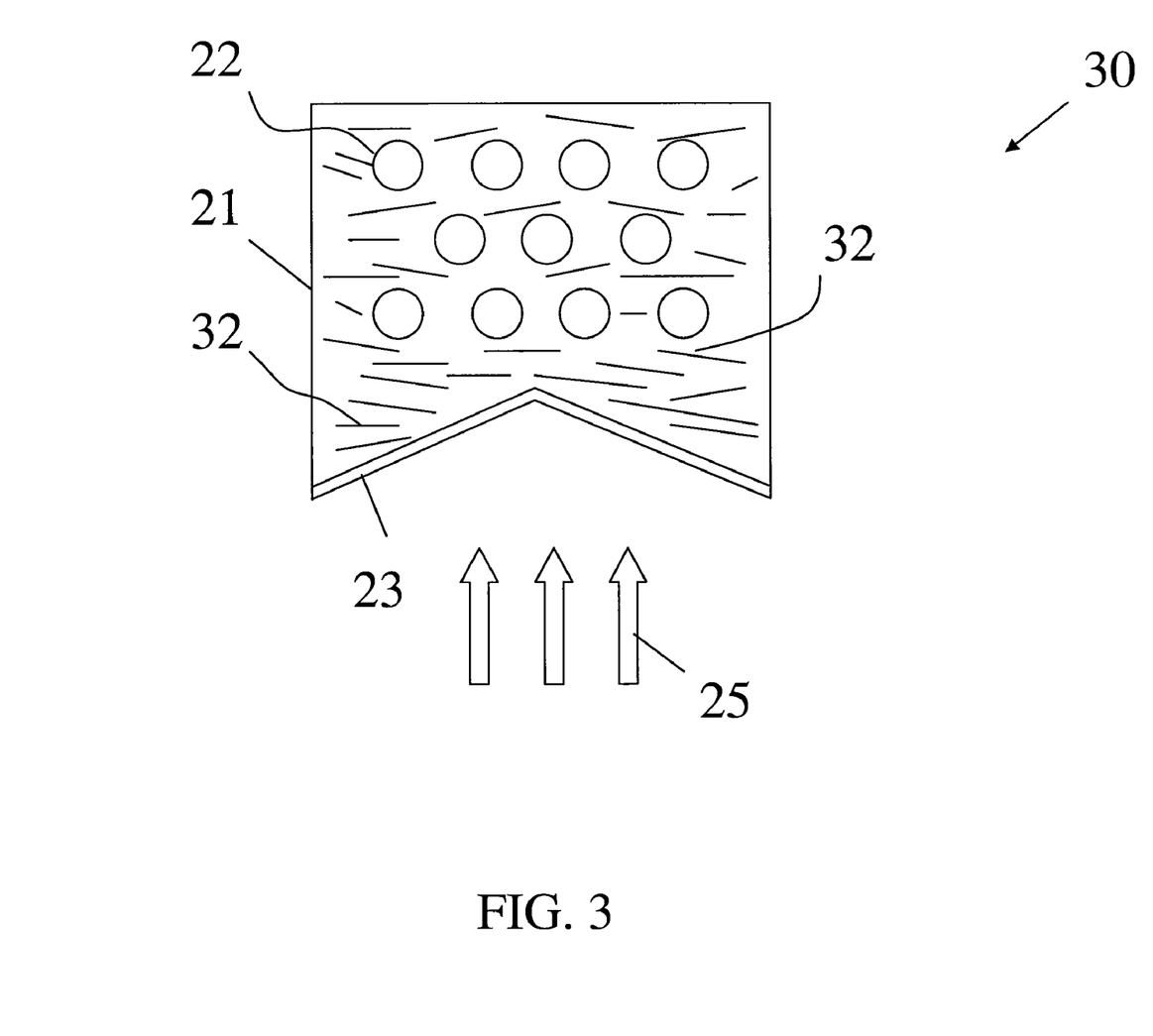
FIG. 3 is a schematic diagram illustrating a thermal conductor of a heat exchanger in accordance with another embodiment of the present invention.

FIG. 3 is a schematic diagram illustrating a thermal conductor 30 of a heat exchanger in accordance with another embodiment of the present invention. Referring to FIG. 3, the thermal conductor 30 has a similar structure to the thermal conductor 20 illustrated in FIG. 2 except it includes a plurality of surface scratches 32. The scratches 32 increase the surface roughness of the base 21, which helps prevent the gathering of condensed water drops by destroying their surface tension, and therefore prevent condensed water drops from plumb falling. The scratches 32, extending in a direction substantially orthogonal to the direction of the gas flow 25, may be formed by rubbing across a surface of the base 21 with an industrial sandpaper or by other process known to those skilled in the art. The laterally extending scratches 32 also help guide condensed water drops onto the flange 23.

Figure 4A:
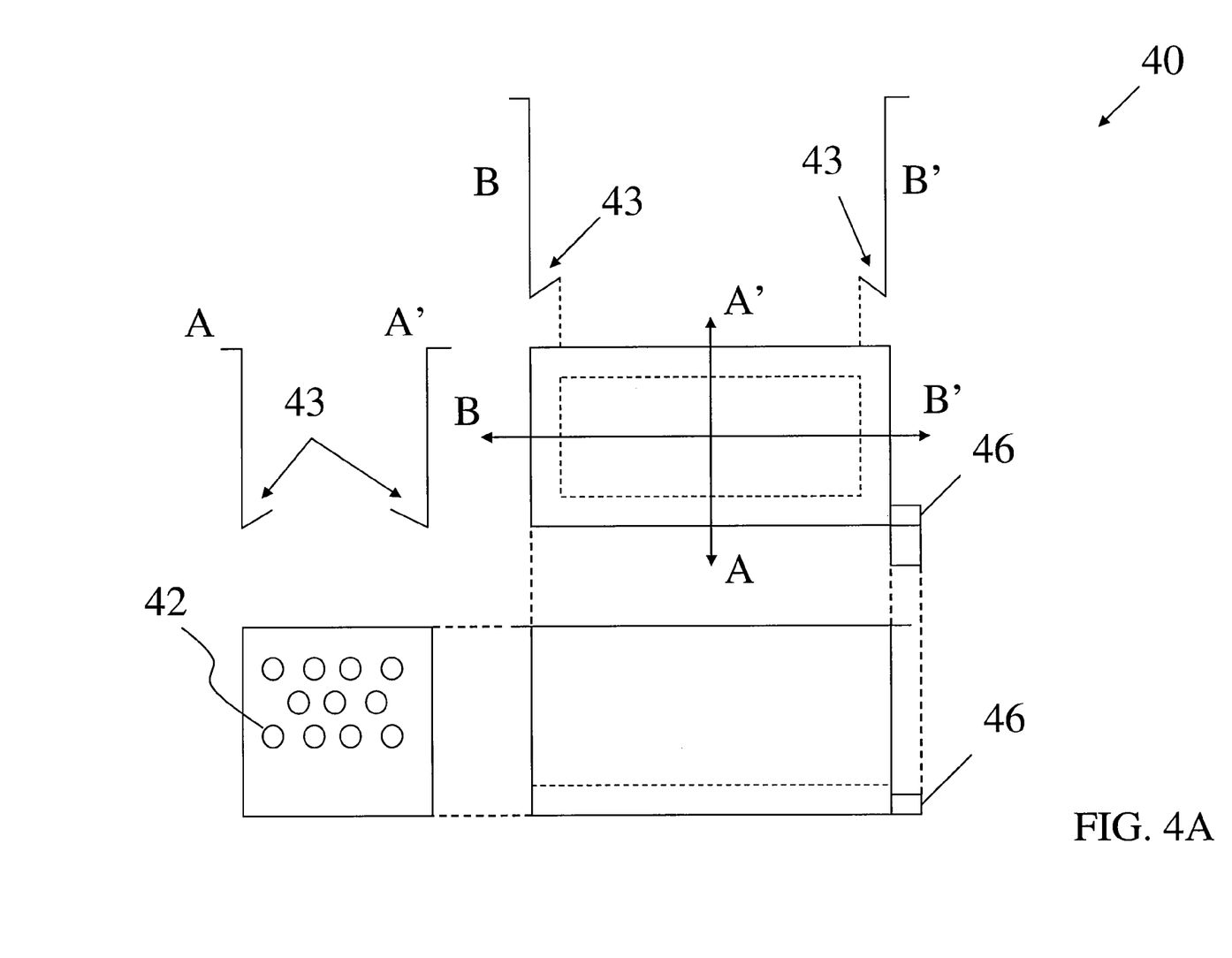
FIG. 4A is a schematic diagram illustrating a front elevational view, a top plan view and a right side elevational view of the interior of a housing of a heat exchanger in accordance with one embodiment of the present invention.

FIG. 4A is a schematic diagram of the interior of a housing 40 of a heat exchanger in accordance with one embodiment of the present invention. Referring to FIG. 4A, the housing 40 includes a plurality of through holes 42, a flange 43 and a drain 46. The through holes 42, corresponding to the through holes of thermal conductors 20 or 30 of the heat exchanger, are provided on two sides of the housing 40 (only one is shown) to accommodate a pipe assembly. The flange 43, as viewed from the AA' and BB' cross sections, is disposed at a lower part of the housing 40. The flange 43 collects condensed water from the surfaces of the thermal conductors. The drain 46, which may be disposed at a lower level than the flange 43, serves as an outlet for discharge of the condensed water collected in the flange 43.

Figure 4B:
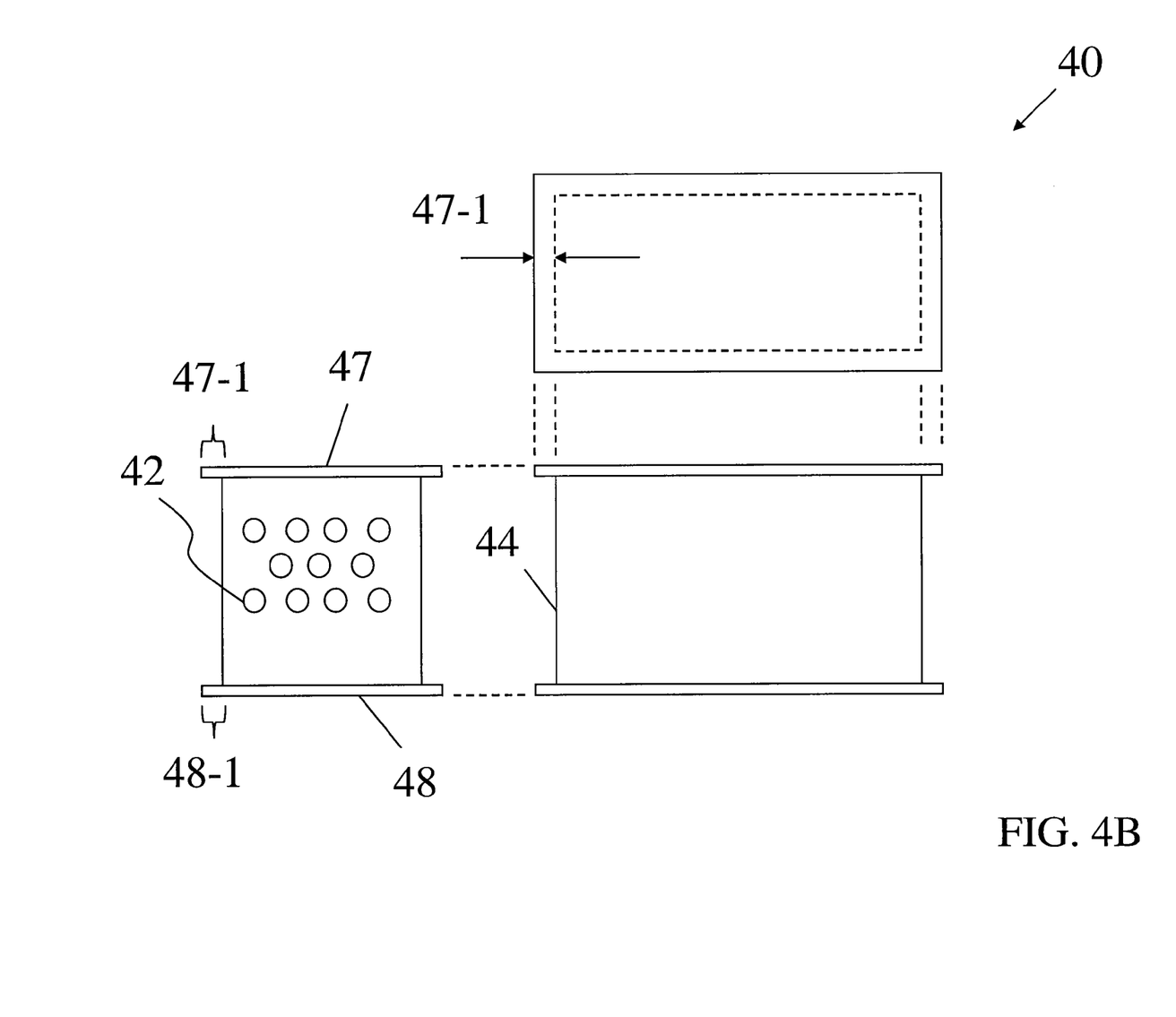
FIG. 4B is a schematic diagram illustrating a front elevational view, a top plan view and a right side elevational view of the exterior of the housing illustrated in FIG. 4A.

FIG. 4B is a schematic diagram of the exterior of the housing 40 illustrated in FIG. 4A. Referring to FIG. 4B, the housing 40 includes a top cover 47 and a bottom cover 48, each of which further includes a protruding portion 47-1 and 48-1, respectively, with respect to a side 44 of the housing 40. The protruding portions 47-1 and 48-1 facilitate affixation of the heat exchanger to another heat exchanger, which will be discussed in following paragraphs.

Figure 5:
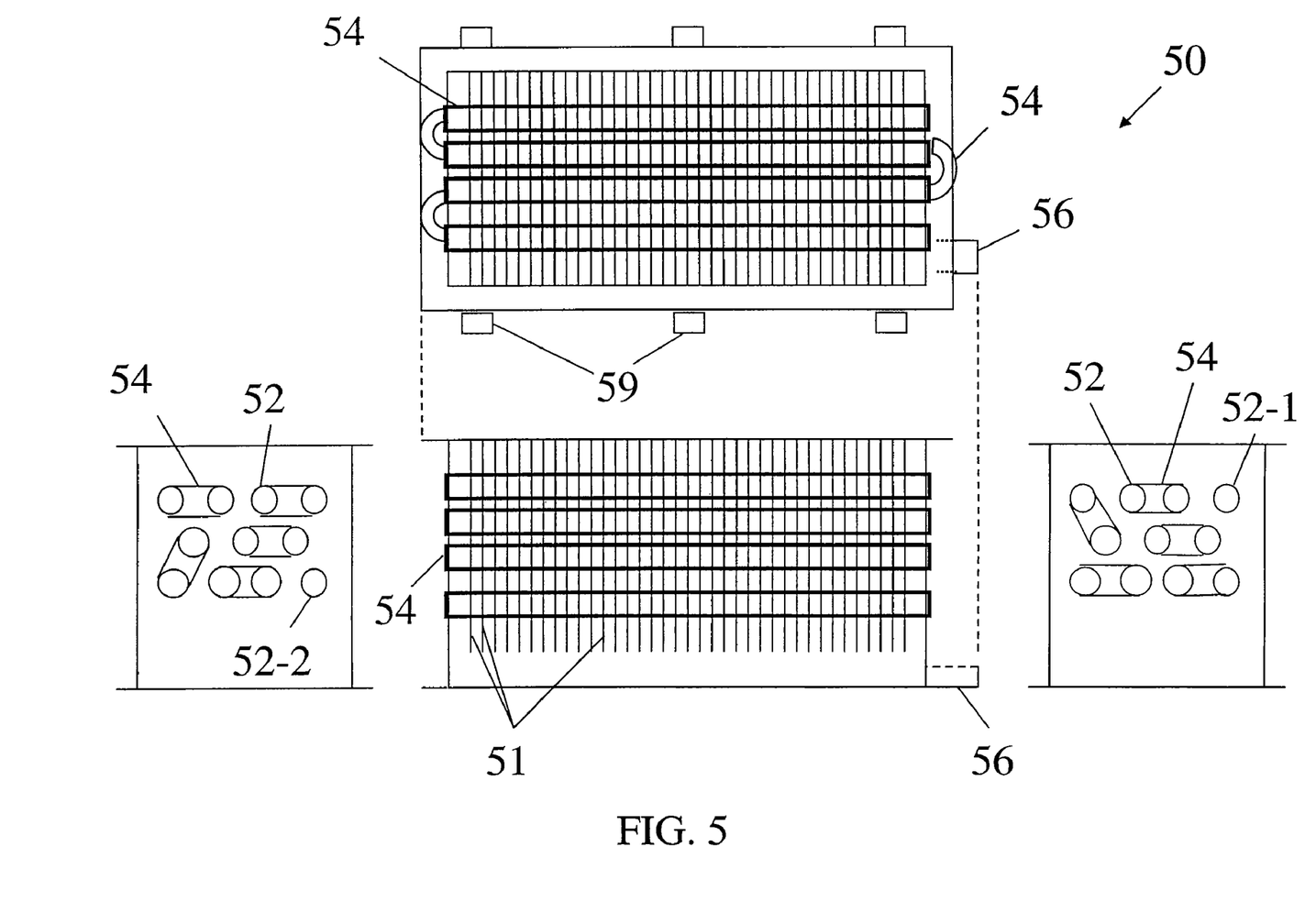
FIG. 5 is a schematic diagram illustrating a front elevational view, a top plan view, a right side elevational view and a left side elevational view of a heat exchanger in accordance one embodiment of the present invention.

FIG. 5 is a schematic diagram of a heat exchanger 50 in accordance with another embodiment of the present invention. Referring to FIG. 5, the heat exchanger 50 includes a plurality of thermal conductors 51, such as fins, disposed in parallel with each other. A plurality of through holes 52, 52-1 and 52-2 are provided to accommodate a pipe assembly 54. The pipe assembly 54 extends windingly from the through hole 52-1 through the heat exchanger 50 to the through hole 52-2. The through holes 52-1 and 52-2 also serve as an inlet for cold water and an outlet for hot water, respectively. In the present example, the through hole 52-1 is positioned at a higher elevation than through hole 52-2. A drain 56, which corresponds to the flanges of the plurality of thermal conductors 51, functions to discharge condensed water. The heat exchanger 50 may be mechanically affixed to another heat exchanger through flanges 59 by, for example, nuts and screws.

Figure 6:
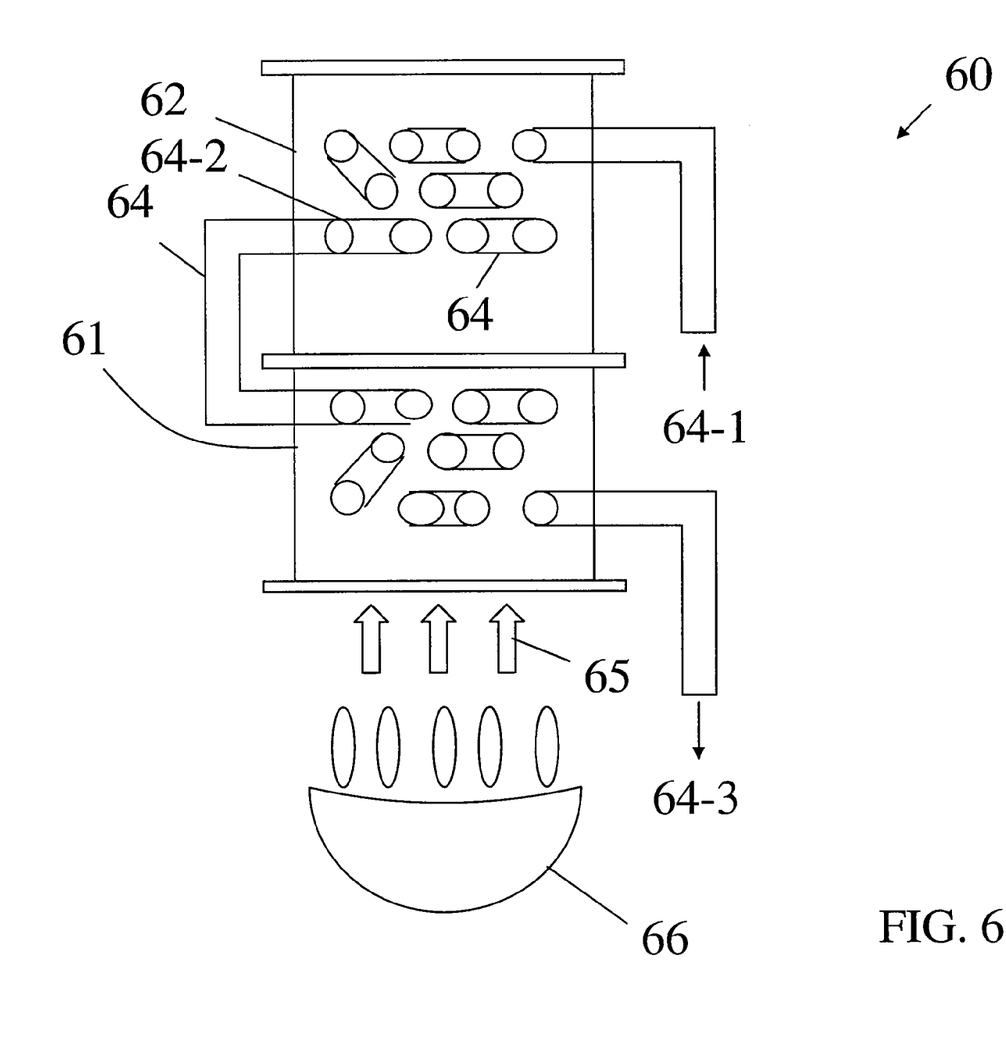
FIG. 6 is a schematic diagram of a gas water heater in accordance with one embodiment of the present invention.

FIG. 6 is a schematic diagram of a gas water heater 60 in accordance with one embodiment of the present invention. Referring to FIG. 6, the gas water heater 60 includes a first heat exchanger 61, a second heat exchanger 62, a pipe assembly 64 and a combustion chamber 66. The second heat exchanger 62 is preferably in the form of one of the above-mentioned embodiments shown in FIGS. 2 to 5. The first heat exchanger 61, disposed between the second heat exchanger 62 and the combustion chamber 66, may include, in one aspect, a conventional heat exchanger such as the heat exchanger 15 of the conventional gas water illustrated in FIG. 1 or, in another aspect, could be another second heat exchanger as the second heat exchanger 62 as shown in FIGS. 2 to 5.

In operation, when the combustion chamber 66 is ignited, cold water provided from an inlet 64-1 to the second heat exchanger 62 is pre-heated by a gas flow 65, specifically, a waste gas flow from the combustion chamber 66. The pre-heated water flowing out of an outlet 64-2 of the second heat exchanger 62 is fed into the first heat exchanger 61 and then heated in the first heat exchanger 61. Consequently, hot water is provided from an outlet 64-3 of the first heat exchanger 61. The thermal efficiency of the gas water heater 60 is improved as compared to the conventional gas water heater illustrated in FIG. 1 because the gas flow 65 is applied to the second heat exchanger 62 in addition to the first heat exchanger 61, resulting in less waste of heat energy. The thermal efficiency of the gas water heater 60 may reach up to approximately 90% while the temperature of the waste gas flow may be reduced to 50° C. That is, a significant part of heat energy that would otherwise be wasted in the conventional design is recycled in the gas water heater 61 according to the present invention.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

It will be appreciated by those skilled in the art that changes could be made to the preferred embodiments described above without departing from the broad inventive concept thereof. It is understood, therefore, that this invention is not limited to the particular embodiments disclosed, but is intended to cover modifications within the spirit and scope of the present application as defined by the appended claims.

We claim:

1. A gas water heater device, comprising:
    a combustion chamber for providing a gas flow;
    a pipe assembly; and
    a heat exchanger disposed over the combustion chamber including a plurality of thermal conductors disposed in parallel with each other, each of the plurality of thermal conductors further comprising:
        a base including a surface further comprising a plurality of surface tension regulating scratches in the surface;
        a plurality of through holes accommodating the pipe assembly therethrough; and
        a flange for collecting condensed water formed on the base.

2. The device of claim 1, wherein the normal direction of the base is generally orthogonal to the direction of the gas flow.

3. The device of claim 1, wherein the flange protrudes from the base.

4. The device of claim 1, wherein the flange has an inverted V shaped with respect to the gas flow.

5. The device of claim 1, wherein the plurality of scratches extend in a direction generally orthogonal to the direction of the gas flow.

6. The device of claim 1, wherein the heat exchanger includes a housing further comprising a flange corresponding to the flange of each of the plurality of thermal conductors.

7. The device of claim 1, wherein the heat exchanger is positioned within a housing, the housing including a drain corresponding to the flange of each of the plurality of thermal conductors.

8. The device of claim 1, wherein the heat exchanger is a first heat exchanger, further comprising a second heat exchanger disposed between the first heat exchanger and the combustion chamber.

9. A gas water heater device, comprising:
a combustion chamber for providing a gas flow;
a pipe assembly;
a first heat exchanger disposed over the combustion chamber including a plurality of thermal conductors disposed in parallel with each other, each of the plurality of thermal conductors further comprising:
a base;
a plurality of through holes accommodating the pipe assembly therethrough; and
a flange for collecting condensed water formed on the base; and
a second heat exchanger disposed between the first heat exchanger and the combustion chamber, wherein the second heat exchanger includes a plurality of thermal conductors disposed in parallel with each other, each of the thermal conductors of the second heat exchanger further comprising:
a base;
a plurality of through holes accommodating the pipe assembly therethrough; and
a flange for collecting condensed water formed on the base.

10. The device of claim 9, wherein the normal direction of the base is generally orthogonal to the direction of the gas flow.

11. The device of claim 9, wherein the flange protrudes from the base.

12. The device of claim 9, wherein the flange has an inverted V shape with respect to the gas flow.

13. The device of claim 9, wherein the base includes a surface further comprising a plurality of scratches therein.

14. The device of claim 13, wherein the plurality of scratches extend in a direction generally orthogonal to the direction of gas flow.

15. The device of claim 9, wherein the first heat exchanger includes a housing further comprising a flange corresponding to the flange of each of the plurality of thermal conductors.

16. The device of claim 9, wherein the first heat exchanger is positioned within a housing, the housing including a drain corresponding to the flange of each of the plurality of thermal conductors.

17. A gas water heater device, comprising:
a combustion chamber for providing a gas flow;
a pipe assembly;
a heat exchanger disposed over the combustion chamber including a plurality of thermal conductors disposed in parallel with each other, each of the plurality of thermal conductors further comprising:
a base;
a plurality of through holes accommodating the pipe assembly therethrough; and
a first flange for collecting condensed water formed on the base; and
a housing including a second flange for collecting water from the first flange of each of the plurality of conductors.

18. The device of claim 17, wherein the heat exchanger is a first heat exchanger, further comprising a second heat exchanger disposed between the first heat exchanger and the combustion chamber.

* * * * *